United States Patent
Tsai et al.

(10) Patent No.: US 9,612,682 B2
(45) Date of Patent: Apr. 4, 2017

(54) TOUCH PANEL AND METHOD FOR DETECTING THE SAME

(71) Applicant: AU Optronics Corporation, Hsin-Chu (TW)

(72) Inventors: Tsang-Hsiang Tsai, Hsin-Chu (TW); Chang-Lung Du, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 105 days.

(21) Appl. No.: 14/800,826

(22) Filed: Jul. 16, 2015

(65) Prior Publication Data

US 2016/0202828 A1 Jul. 14, 2016

(30) Foreign Application Priority Data

Jan. 9, 2015 (TW) .............................. 104100778 A (51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 2203/04103* (2013.01)

(58) Field of Classification Search
CPC ......... G06F 2203/04103; G06F 3/0416; G06F 3/044
USPC ................................. 345/173–174; 178/18.06
See application file for complete search history.

(56) References Cited

U.S. PATENT DOCUMENTS

| 7,605,793 | B2 | 10/2009 | Lee | |
|---|---|---|---|---|
| 2008/0012842 | A1 | 1/2008 | Mori | |
| 2012/0105338 | A1 | 5/2012 | Lin et al. | |
| 2012/0187954 | A1* | 7/2012 | Hsu | G01R 31/026 324/537 |
| 2012/0293455 | A1* | 11/2012 | Shen | G06F 3/0418 345/174 |
| 2013/0002607 | A1* | 1/2013 | Bayramoglu | G06F 3/044 345/174 |
| 2014/0292708 | A1* | 10/2014 | Kwon | G06F 3/044 345/174 |
| 2016/0146874 | A1* | 5/2016 | Guo | G01R 31/025 324/509 |

FOREIGN PATENT DOCUMENTS

| TW | 201218632 | 5/2012 |
|---|---|---|
| TW | 201308148 | 2/2013 |
| TW | 201335605 | 9/2013 |

* cited by examiner

*Primary Examiner* — Hong Zhou
(74) *Attorney, Agent, or Firm* — WPAT, PC; Justin King; Douglas Hosack (57) ABSTRACT

A touch panel includes electrode lines and a detecting circuit. The detecting circuit includes driving units and detecting units. The driving units are configured to sequentially output driving signals to the electrodes lines according to a first clock signal, so as to change the voltage levels of the electrode lines. Two ends of each of the electrode lines are respectively coupled to a driving unit and a corresponding detecting unit. The detecting units are configured to sequentially scan the voltage levels of the electrode lines according to a second clock signal and to output scan signals, in which the first clock signal and the second clock signal have different frequencies. The detecting circuit generates a detecting signal according to the scan signals.

11 Claims, 10 Drawing Sheets

TOUCH PANEL AND METHOD FOR DETECTING THE SAME

RELATED APPLICATIONS

This application claims priority to Taiwan Application Serial Number 104100778, filed Jan. 9, 2015, which is herein incorporated by reference.

BACKGROUND

Field of Invention

The present invention relates to a touch panel. More particularly, the present invention relates to a touch panel including a detecting circuit.

Description of Related Art

In recent years, a touch panel used as an input device is incorporated in a display device. The display device equipped with the touch panel allows a user to input information by performing a touch operation with a user's finger or a pen. Therefore, the touch panel is applied on a handset, a tablet, and another electronic device that utilizes a touch control operation.

Generally, the touch panel is mass-produced. During fabrication, because the manufacturing process of the touch panel has a number of steps, when an error occurs in one of the steps, the touch panel may not work due a defect generated in the step, and has to be scraped. In other words, if the touch panel with the defect is continuously processed in subsequent processes on the production line, devices assembled on the touch panel in the subsequent processes have to be scraped, thus increasing the manufacture cost.

SUMMARY

An aspect of the present invention is to provide a touch panel including electrode lines and a detecting circuit, in which the detecting circuit includes driving units and detecting units. The detecting circuit is configured to detect a connecting status of each of the electrode lines through the driving units and the detecting units, in which the connecting status includes, for example, a normal status, a short-circuit status, and an open-circuit status. Since the touch panel uses the detecting circuit to perform the detecting operation without needing to use the receiver electrodes (Rx), the touch electrodes (or transmitter electrodes, Tx) can be detected first. After being installed on the touch panel, the receiver electrodes can be detected again to determine whether the connecting statuses of the receiver electrodes are normal.

An aspect of the present invention is to provide a touch panel including electrode lines and a detecting circuit. The detecting circuit includes driving units and detecting units. The driving units are configured to sequentially output driving signals to the electrodes lines according to a first clock signal, so as to change the voltage levels of the electrode lines. Two ends of each of the electrode lines are respectively coupled to one of the driving units and a corresponding one of the detecting units. The detecting units are configured to sequentially scan the voltage levels of the electrode lines according to a second clock signal and to output scan signals, in which the first clock signal and the second clock signal have different frequencies. The detecting circuit generates a detecting signal according to the scan signals.

In some embodiments, an N-th driving unit of the driving units is configured to output a shift signal to an (N+1)-th driving unit of the driving units, in which N is a positive integer. The N-th driving unit includes a first shift-register and a first level converting unit. The first shift-register circuit is configured to receive the first clock signal and the shift signal outputted by an (N−1)-th driving unit and to generate a first control signal after receiving the shift signal. The first level converting unit is configured to output the driving unit according to the first control signal.

In some embodiments, an N-th detecting unit of the detecting units is configured to output a shift signal to an (N+1)-th detecting unit of the detecting units, in which N is a positive integer. The N-th detecting unit includes a second shift-register circuit and a second level converting unit. The second shift-register circuit is configured to receive the second clock signal and the shift signal outputted by an (N−1)-th detecting unit and to generate a second control signal after receiving the shift signal. The second level converting unit is configured to scan the voltage level of one of the corresponding electrode lines according to the second control signal, so as to output the scan signal.

In some embodiments, the touch panel further includes first terminals and second terminals. The first terminals are respectively electrically connected to the driving units and a jig. The second terminals are respectively electrically connected to the detecting units and the jig. The first clock signal is transmitted from the jig to the driving units via the first terminals, and the second clock signal is transmitted from the jig to the detecting units via the second terminals.

In some embodiments, the touch panel further includes a driving chip. The driving chip is electrically connected to the driving units, the detecting units, and a jig. The driving chip is configured to respectively transmit the first clock signal and the second clock signal provided by the jig to the driving units and the detecting units.

In some embodiments, the touch panel further includes a driving chip and a flexible circuit board. The driving chip is electrically connected to the driving units and the detecting units. The driving chip is configured to output the first clock signal to the driving units and output the second clock signal to the detecting units. The flexible circuit board is electrically connected to the driving chip and a jig. The flexible circuit board is configured to transmit the first clock signal and the second clock signal to the driving chip.

In some embodiments, the touch panel further includes a driving chip, a flexible circuit board, receiver electrode lines, a touch circuit board, and a touch chip. The driving chip is electrically connected to the driving units and the detecting units. The driving chip is configured to output the first clock signal to the driving units and output the second clock signal to the detecting units. The flexible circuit board is electrically connected to the driving chip and a jig. The flexible circuit board is configured to transmit the first clock signal and the second clock signal provided by the jig to the driving chip. The receiver electrode lines are disposed on the electrode lines, in which the receiver electrode lines and the electrode lines are grid-shaped. The touch circuit board is electrically connected to the driving chip and the receiver electrode lines. The touch chip is electrically connected to the touch circuit board and configured to scan the level voltages of the receiver electrode lines.

An aspect of the present invention is to provide a method for detecting a touch panel. The method includes a number of steps. Driving signals are outputted to electrode lines by driving units according to a first clock signal, so as to change the voltage levels of the electrode lines. The voltage levels of the electrode lines are scanned by detecting units according to a second clock signal so as to output a plurality of scan signals, in which the first clock signal and the second clock signal have different frequencies. A detecting signal is generated according to the scan signals so as to determine a connecting status of each of the electrode lines.

In some embodiments, the frequency of the first clock signal is smaller than the frequency of the second clock signal. The frequency of the second clock signal is in a range from A times the frequency of the first clock signal to 2A times the frequency of the first clock signal, in which A is the number of the driving units.

In some embodiments, the method further includes a step of outputting an initiating signal to a first detecting unit of the detecting units, in which the number of times of outputting the initiating signal to the first detecting unit and the number of the driving units are the same.

In some embodiments, the method further a number of steps. A first initiating signal is outputted to a first driving unit of the driving units. A second initiating signal is outputted to a first detecting unit of the detecting units. A ratio of the number of times of outputting the first initiating signal to the number of times of outputting the second initiating signal is from 1 to X, in which X is the number of the driving units.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, although the terms first, second, third etc. may be used herein to describe various elements, these elements should not be limited by these terms.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A touch panel includes a touch circuit formed by transmitter electrodes (Tx) and receiver electrodes (Rx), and a user can perform a touch operation through the touch circuit. When a capacitance of the touch circuit is changed by touching, a controller can determine which position of the touch panel is touched according to the capacitance difference. However, when the touch circuit does not work due to an unexpected situation, such as a short-circuit or open-circuit, it cannot be determined if the unexpected situation occurs at the transmitter electrodes or the receiver electrodes of the touch circuit. Furthermore, it cannot be analyzed to know if this unexpected situation is caused by the short-circuit or the open-circuit.

In view of the above problem, a touch panel of the present invention includes electrode lines and a detecting circuit, in which the electrode lines and the detecting circuit are a portion of transmitter electrodes (Tx) of the touch panel. In a manufacturing process of the touch panel, after the transmitter electrodes are formed, the electrode lines and the detecting circuit can be used to detect if the circuit connecting status of the touch panel is normal. Therefore, the touch panel can be detected to know if the unexpected situation occurs at an early stage, such as the short-circuit status or the open-circuit status. Moreover, in the subsequent steps of the manufacturing process, the connecting status of the touch panel can be continuously detected by a jig, so as to ensure that the touch panel processed in the subsequent steps does not defects.

Figure 1:
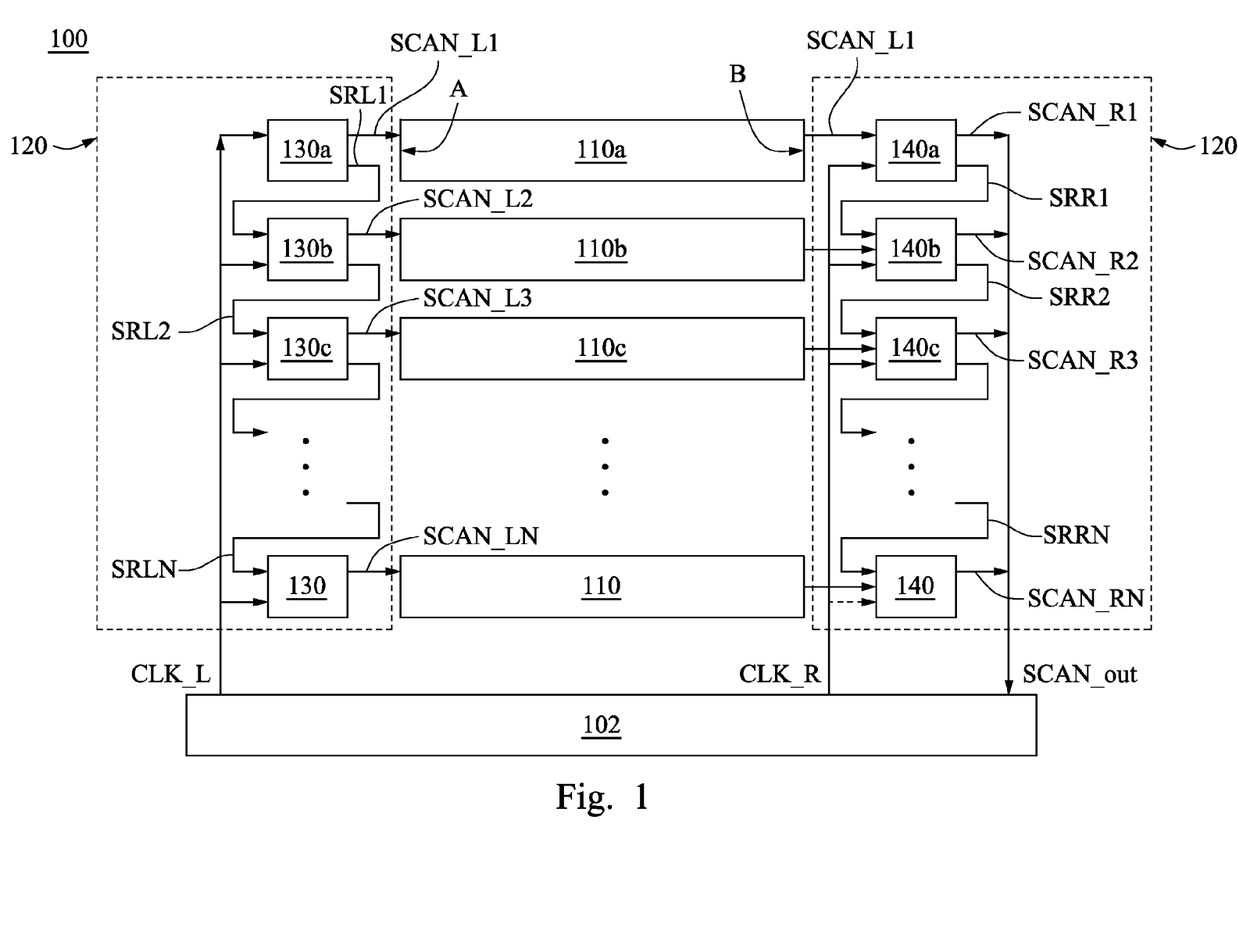
FIG. 1 is a schematic diagram illustrating a configuration of a touch panel according to a first embodiment of this invention.

FIG. 1 is a schematic diagram illustrating a configuration of a touch panel 100 according to a first embodiment of this invention. A touch panel 100 includes electrode lines 110 and a detecting circuit 120. The detecting circuit 120 includes driving units 130 and detecting units 140. The driving units 130 are configured to sequentially output driving signals SCAN_L1-SCAN_LN to the electrodes lines 110 according to a first clock signal CLK_L, so as to change the voltage levels of the electrode lines 110. Two ends of each of the electrode lines 110 are respectively coupled to one of the driving unit 130 and a corresponding one of the detecting unit 140. That is, a first end and a second end of each of the electrode lines 110, which are opposite to each other, are respectively coupled to one of the driving unit 130 and a corresponding one of the detecting unit 140. For example, a first end A and a second end B of the electrodes lines 110, which are opposite to each other, are respectively coupled to the driving unit 130a and the detecting unit 140a. The detecting units 140 are configured to sequentially scan the voltage levels of the electrode lines 110 according to a second clock signal CLK_R and to output scan signals SCAN_R1-SCAN_RN, in which the first clock signal CLK_L and the second clock signal CLK_R have different frequencies. The detecting circuit 120 generates a detecting signal SCAN_out according to the scan signals SCAN_R1-SCAN_RN. The detecting circuit 120 is connected to a jig 102, and the jig 102 provides the detecting circuit 120 with the first clock signal CLK_L, the second clock signal CLK_R, and a voltage source, and is configured to receive the detecting signal SCAN_out sent by the detecting circuit 120.

As shown in FIG. 1, after the jig 102 receives the detecting signal SCAN_out sent by the detecting circuit 120, a connecting status of each of the electrodes lines 110 of the touch panel 110 can be determined by the waveforms of the detecting signal SCAN_out. The connecting status of each of the electrodes lines 110 includes a normal status, a short-circuit status, or an open-circuit status. In other words, with the detecting signal SCAN_out, it can be determined if the touch panel 100 is defective.

In some embodiments, in the touch panel 100, the detecting circuit 120 and the electrode lines 110 are the parts of the transmitter electrodes (Tx). That is, the touch panel 100 doesn't need an extra manufacturing process to form the detecting circuit 120 and the electrode lines 110. Moreover, as the transmitter electrodes of the touch panel 100 are formed, the detecting circuit 120 can perform a detecting operation without the receiver electrodes (Rx). In addition, since the first clock signal CLK_L and the second clock signal CLK_R have different frequencies, the detecting circuit 120 can detect the voltage levels of the electrode lines 110 one by one.

For example, in some embodiments, the frequency of the first clock signal CLK_L is smaller than the frequency of the second clock signal CLK_R. As the driving signal SCAN_L1 is outputted to the electrode line 110a by the driving unit 130a, the electrode line 110a is defined as a high-voltage level, and each of the other electrode lines 110 is defined as a low-voltage level. Then, the driving units 140 start detecting the voltage levels of the electrode lines 110 in sequence. Under the condition that the frequency of the first clock signal CLK_L is smaller than the frequency of the second clock signal CLK_R, the driving units 140 can finish scanning the electrode lines 110 within a period that the driving unit 130a outputs the driving signal SCAN_L1, in which each of the electrode lines 110 is scanned by its connected detecting unit 140.

During the period in which the driving unit 130a outputs the driving signal SCAN_L1 under the connecting status at which each of the electrode lines 100 is normal, since the detecting result of the detecting unit 140a corresponding to the electrode line 110a is at the high-voltage level, the scan signal SCAN_R1 outputted by the detecting unit 140a is also at the high-voltage level. Similarly, since the detecting results of the detecting unit 140b and 140c respectively corresponding to the electrode lines 110b and 110c are at low-voltage levels, the scan signals SCAN_R2 and SCAN_R3 outputted by the detecting units 140b and 140c are also at the low-voltage levels.

Therefore, under the normal connecting status, the detecting signal SCAN_out generated according to the scan signals SCAN_R1-SCAN_RN has an impulse corresponding to the scan signal SCAN_R1. Otherwise, under the unexpected connecting status, the detecting signal SCAN_out has a waveform that is different from the waveform under the normal connecting status.

In other words, by detecting the electrode lines 110 one by one, when the detecting signal SCAN_out has a waveform that is different from the normal waveform, it can be determined that the unexpected connecting status occurs at the electrode lines 110. Moreover, with the waveform of the detecting signal SCAN_out, the electrode lines 110 can be further analyzed to determine if the unexpected connecting status is the short-circuit status or the open-circuit status.

In addition, since the driving signals SCAN_L1-SCAN_LN are respectively outputted to the electrode lines 110 in sequence by the detecting circuit 120, the driving units 130 of the detecting circuit 120 are also initiated sequentially. In some embodiments, an N-th driving unit 130 of the driving units 130 is configured to output a shift signal SRLN to an (N+1)-th driving unit 130 of the driving units 130, in which N is a positive integer. For example, the driving unit 130a outputs a shift signal SRL1 to the driving unit 130b so as to initiate the driving unit 130b. Then, the driving unit 130b outputs a shift signal SRL2 to the driving unit 130c so as to initiate the driving unit 130c, thereby finishing initiating the driving units 130 sequentially.

However, the transmitting direction of the aforementioned detecting signal SCAN_out is exemplary, and the transmitting direction of present invention is not limited to this regard. Since the arrangement of the driving units 130 and the detecting units 140 of the detecting circuit 120 is symmetric, a person having ordinary skill in the art may choose a proper transmitting direction of the driving signals SCAN_L1-SCAN_LN. In the present embodiment, the driving signals SCAN_L1-SCAN_LN are transmitted from the left-hand side to the right side of the detecting circuit 120, and then the detecting circuit 120 scans the signals by the right-side circuit. In some embodiments, the driving signals SCAN_L1-SCAN_LN are transmitted from the right side to the left side of the detecting circuit 120, and then the detecting circuit 120 scans the signals by the left-side circuit.

Figure 2:
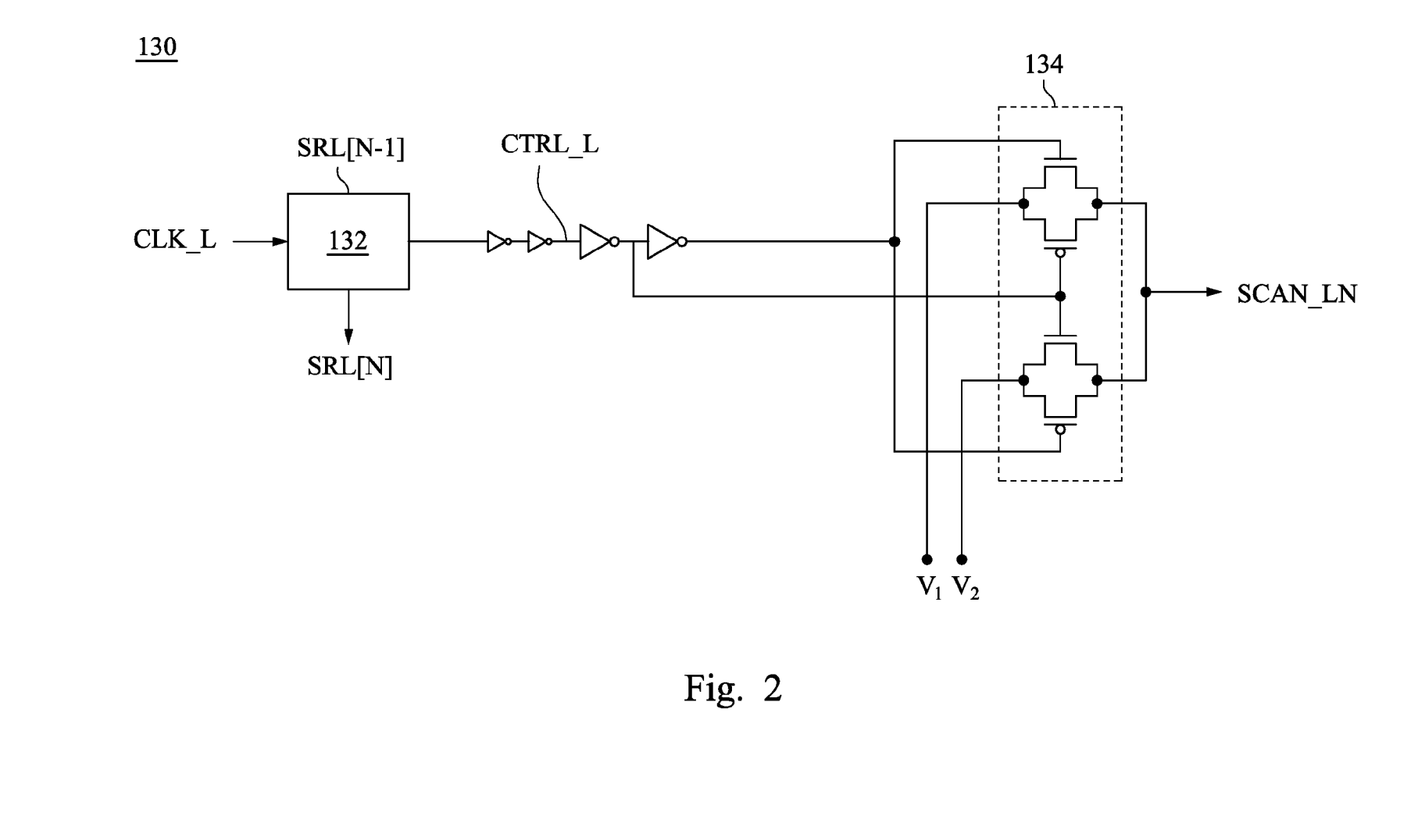
FIG. 2 is a schematic diagram illustrating a configuration of a driving unit of a touch panel according to one embodiment of this invention.

FIG. 2 is a schematic diagram illustrating a configuration of a driving unit 130 of a touch panel 100 according to one embodiment of this invention. FIG. 2 illustrates one of the driving units 130 in FIG. 1, and the N-th driving unit 130 is used as a representation herein. The N-th driving unit 130 includes a first shift-register 132 and a first level converting unit 134. The first shift-register circuit 132 is configured to receive the first clock signal CLK_L and the shift signal SRL[N−1] outputted by an (N−1)-th driving unit 130 and to generate a first control signal CTRL_L after receiving the shift signal SRL[N−1]. The first level converting unit 134 is configured to output the driving unit SCAN_LN according to the first control signal CTRL_L.

As previously described, since the driven units 130 of the detecting circuit 120 (see FIG. 1) are initiated sequentially, the first shift-register 132 is also configured to output the shift signal SRL[N] to the (N+1)-th driving unit 130. After the N-th driving unit 130 receives the shift signal SRL[N−1], the N-th driving unit 130 outputs the driving signal SCAN_LN. Then, after the N-th driving unit 130 finishes outputting the driving signal SCAN_LN, the N-th driving unit 130 outputs the shift signal SRL[N] to the (N+1)-th driving unit 130.

In addition, in some embodiments, the first level converting unit 134 is coupled to a first electrical potential V1 and a second electrical potential V2, in which the first electrical potential V1 and the second electrical potential V2 can be provided by the jig 102 (see FIG. 1). The first electrical potential V1 is greater than the second electrical potential V2, and for example, the second electrical potential V2 may be a ground potential, but is not limited thereto.

If the first level converting unit 134 receives the first control signal CTRL_L, the driving signal SCAN_LN outputted by the first level converting unit 134 will have the same electrical potential as the first electrical potential V1. Otherwise, if the first level converting unit 134 does not receive the first control signal CTRL_L yet, the driving signal SCAN_LN outputted by the first level converting unit 134 will have the same electrical potential as the second electrical potential V2.

That is, under the situation that the (N)-th driving unit 130 does not receive the shift signal SRL[N−1] yet, the driving signal SCAN_LN outputted by the first level converting unit 134 has the same electrical potential as the second electrical potential V2. Moreover, since the first electrical potential V1 is greater than the second electrical potential V2, the driving signal SCAN_LN outputted by the first level converting unit 134 has an impulse.

Referring back to FIG. 1, similarly, since the detecting circuit 120 scans the voltage levels of the electrode lines in sequence, the detecting units 140 of the detecting circuit 120 are also initiated sequentially. In some embodiments, an N-th detecting unit 140 of the detecting units 140 is configured to output a shift signal SRRN to an (N+1)-th detecting unit 140 of the detecting units 140, in which N is a positive integer. For example, the detecting unit 140a outputs a shift signal SRL1 to the detecting unit 140b to initiate the detecting unit 140b. Then, the detecting unit 140b outputs a shift signal SRL2 to the detecting unit 140c to initiate the detecting unit 140c, thereby finishing initiating the detecting units 140 sequentially.

Figure 3:
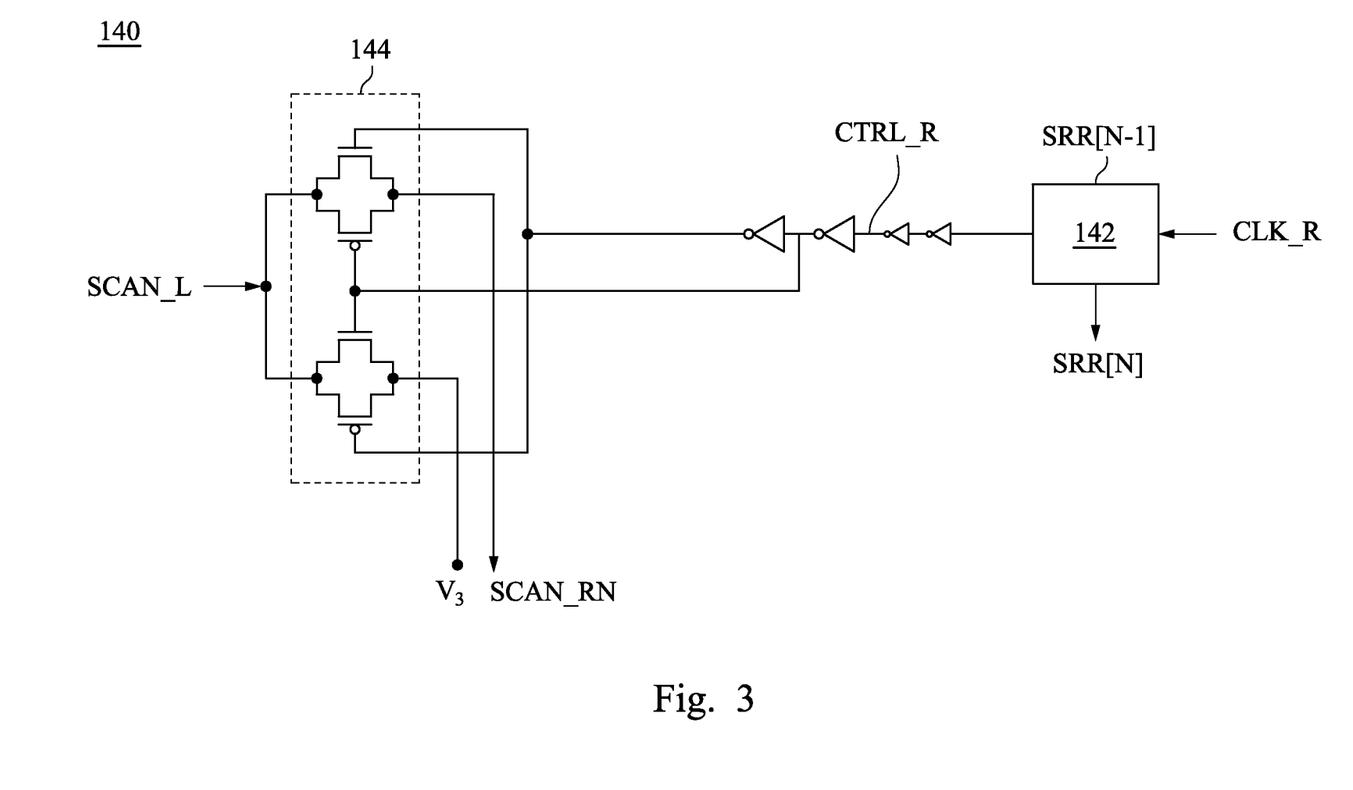
FIG. 3 is a schematic diagram illustrating a configuration of a detecting unit of a touch panel according to one embodiment of this invention.

FIG. 3 is a schematic diagram illustrating a configuration of a detecting unit 140 of a touch panel 100 according to one embodiment of this invention. FIG. 3 illustrates one of the detecting units 140 in FIG. 1, and the N-th detecting unit 140 is used as a representation herein. The N-th detecting unit 140 includes a second shift-register circuit 142 and a second level converting unit 144. The second shift-register circuit 142 is configured to receive the second clock signal CLK_R and the shift signal SRR[N−1] outputted by an (N−1)-th detecting unit 140 and to generate a second control signal CTRL_R after receiving the shift signal SRR[N−1]. The second level converting unit 144 is configured to scan the voltage level of one of the corresponding electrode lines 110 (see FIG. 1) according to the second control signal CTRL_R, so as to output the scan signal SCAN_RN. Since a frequency of generating the second control signal CTRL_R by the second shift-register circuit 142 and the frequency of the second clock signal CLK_R are the same, the frequency of scanning the voltage level of the corresponding electrode line 110 by the second level converting unit 144 and the frequency of the second clock signal CLK_R are the same.

As previously described, since the detecting units 140 of the detecting circuit 120 (see FIG. 1) are initiated sequentially, the second shift-register 142 is also configured to output the shift signal SRR[N] to the (N+1)-th detecting unit 140. That is, as the N-th detecting unit 140 receives the shift signal SRL[N−1], the N-th detecting unit 140 starts scanning the voltage level of the corresponding electrode line 110 (see FIG. 1). After the N-th detecting unit 140 finishes scanning, the N-th detecting unit 140 outputs the shift signal SRR[N] to the (N+1)-th detecting unit 140.

In addition, in some embodiments, the second level converting unit 144 is coupled to a third electrical potential V3, in which the third electrical potential V3 can be provided by the jig 102 (see FIG. 1). For example, the third electrical potential V3 may be a ground potential or may be the same as the second electrical potential V2 (see FIG. 2), but is not limited thereto.

When the second level converting unit 144 scans the electrode line 110 (see FIG. 1), if the second level converting unit 144 receives the corresponding driving signal SCAN_LN (and thus, the electrode line 110 scanned by the second level converting unit 144 has the high-voltage level), the second level converting unit 144 will output the scan signal SCAN_RN which has the same voltage level as the driving signal SCAN_LN. Otherwise, if the second level converting unit 144 does not receive the corresponding driving signal SCAN_LN (and thus, the electrode line 110 scanned by the second level converting unit 144 has the low-voltage level), the second level converting unit 144 will output the scan signal SCAN_RN which has the same voltage level as the second electrical potential V2 (see FIG. 2). Therefore, during the scanning operation, if the N-th detecting unit 140 scans the driving signal SCAN_LN with the high-voltage level, the scan signal SCAN_RN outputted by the N-th detecting unit 140 will have an impulse.

In the following embodiments, descriptions are provided with respect to a relationship between the various signals during the detecting operation.

Figure 4:
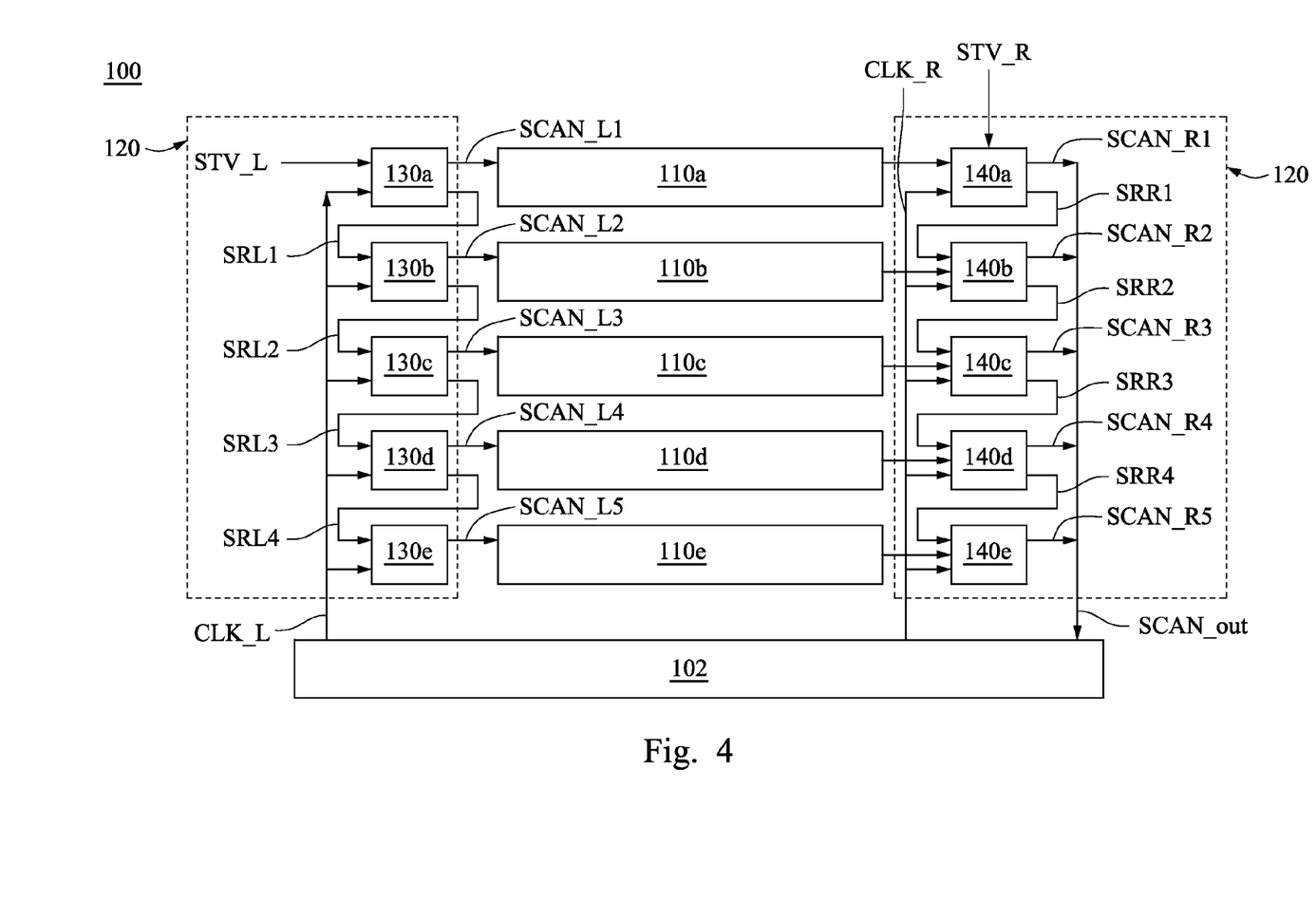
FIG. 4 is a schematic diagram illustrating a configuration of a touch panel according to a second embodiment of this invention.
Figure 5:
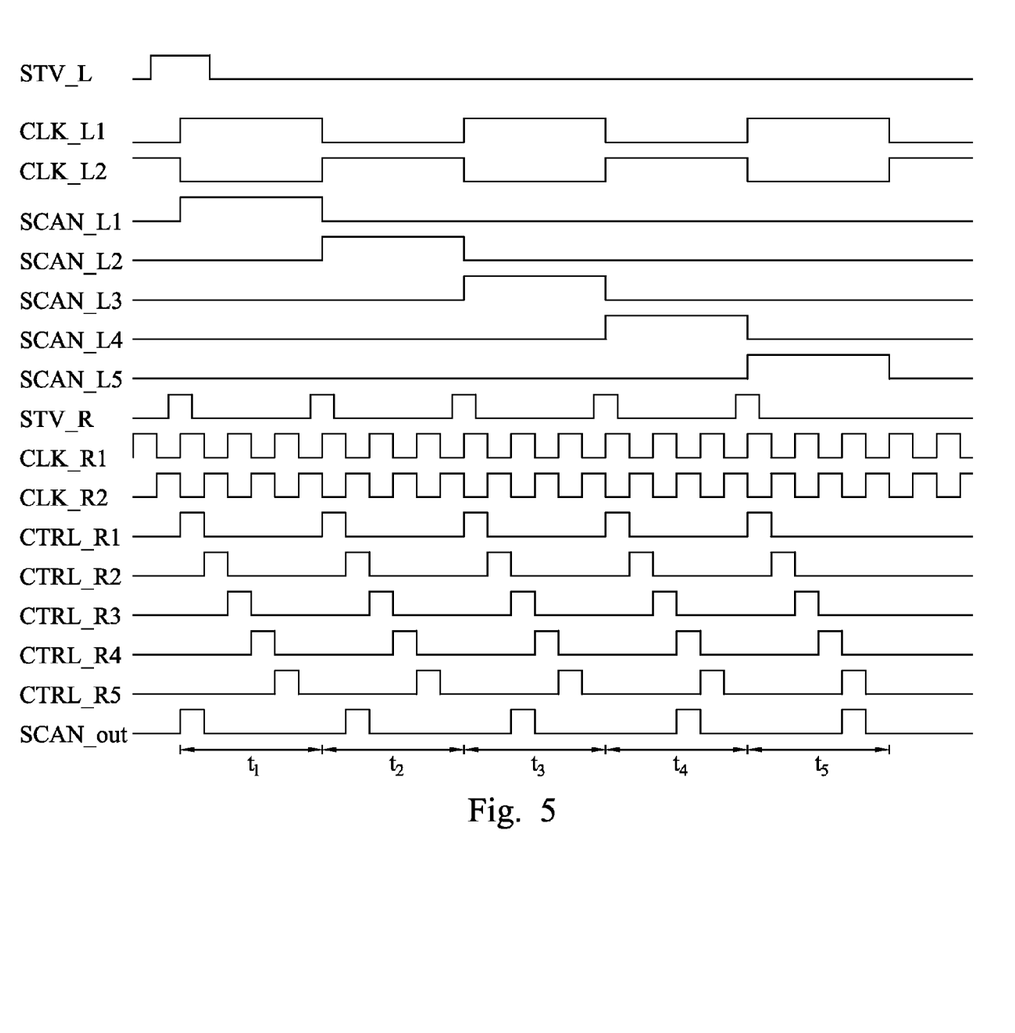
FIG. 5 is a timing diagram of signals when the touch panel in FIG. 4 is under a detecting operation.

FIG. 4 is a schematic diagram illustrating a configuration of a touch panel 100 according to a second embodiment of this invention. FIG. 5 is a timing diagram of signals when the touch panel 100 in FIG. 4 is under a detecting operation. The difference between the present embodiment and the first embodiment is that the touch panel 100 has five electrode lines 110a-110e, and the detecting circuit 120 has five driving units 130a-130e and five detecting units 140a-140e.

In the present embodiment, a method for detecting the touch panel 100 includes a number of steps. The driving signals SCAN_L1-SCAN_L5 are outputted to the electrode lines 110a-110e by the driving units 130a-130e according to the first clock signal CLK_L, so as to change the voltage levels of the electrode lines 110a-110e. Then, the voltage levels of the electrode lines 110a-110e are scanned by the detecting units 140a-140e according to the second clock signal CLK_R so as to output the scan signals SCAN_R1-SCAN_R5, in which the first clock signal CLK_L and the second clock signal CLK_R have different frequencies. The detecting signal SCAN_out is generated according to the scan signals SCAN_R1-SNAR_R5, so as to determine the connecting status of each of the electrode lines 110a-110e.

In some embodiments, the frequency of the first clock signal CLK_L is smaller than the frequency of the second clock signal CLK_R. The frequency of the second clock signal CLK_R is in a range from A times the frequency of the first clock signal CLK_L to 2A times the frequency of the first clock signal CLK_L, in which A is the number of the driving units 130a-130e. In the present embodiment, since the number of the driving units 130a-130e is five, the second clock signal CLK_R is in a range from 5 times the frequency of the first clock signal CLK_L to 10 times the frequency of the first clock signal CLK_L.

As shown in FIG. 5, the second clock signal CLK_R is 6 times the frequency of the first clock signal CLK_L. Under this frequency ratio, the detecting units 140a-140e can sequentially scan the electrode lines 110a-110e one by one within the period in which each of the driving units 130a-130e outputs the driving signal SCAN_L1-SCAN-L5.

In addition, the clock signals received by the driving units 130a, 130c, and 130e and the clock signals received by the driving units 130b and 130d are configured to be in reversed phase each other. For example, as shown in FIG. 5, the first clock signal CLK_L includes a clock signals CLK_L1 and CLK_L2 illustrated in FIG. 5. In some embodiments, the driving units 130a, 130c, and 130e are configured to receive the clock signal CLK_L1, and the driving units 130b and 130d are configured to receive the clock signal CLK_L2. In other embodiments, the driving units 130a, 130c, and 130e are configured to receive the clock signal CLK_L2, and the driving units 130b and 130d are configured to receive the clock signal CLK_L1.

Similarly, the second clock signal CLK_R includes a clock signal CLK_R1 and CLK_R2 illustrated in FIG. 5, such that the clock signals received by the detecting units 140a, 140c, and 140e and the clock signals received by the detecting units 140b and 140d are configured to be in reversed phase each other. The description in this regard will not be repeated.

The following descriptions are provided with the situation that the connecting status of each of the electrode liens 110a-110e is normal. For making the description succinct, the period in which the driving units 130a-130e sequentially output the driving signal SCAN_L1-SCAN-L5 is divided into five time periods t1-t5. For example, the driving unit 130a outputs the driving signal SCAN_L1 in the time period t1, and the electrode line 110a has the high-voltage level in time period t1.

At a beginning of the detecting operation, the jig 102 provides the driving unit 130a with the first initiating signal STV_L. As the driving unit 130a receives the first initiating signal STV_L, the driving unit 130a outputs the driving signal SCAN_L1 to the electrode line 110a. In addition, in the period in which the driving unit 130a receives the first initiating signal STV_L, the jig 102 provides the detecting unit 140a with a second initiating signal STV_R.

The detecting units 140a-140e respectively scan the electrode lines 110a-110e in sequence. As previously described, the detecting units 140a-140e scan the electrode lines 110a-110e in sequence under the condition that the second control signal CTRL_R1-CTRL_R5 are generated in the detecting units 140a-140e, in which the frequencies of the second control signal CTRL_R1-CTRL_R5 and the frequency of the second clock signal CLK_R are the same. Therefore, the detecting units 140a-140e respectively perform scanning in the enabling periods of the second control signals CTRL_R1-CTRL_R5. Then, according to the scan result, the detecting units 140a-140e respectively output the scan signals SCAN_R1-SCAN_R5 to generate the detecting signal SCAN_out by superposing.

In the time period t1, the voltage level of the electrode line 110a is high, and the voltage levels of the electrode lines 110b-110e are low. In other words, in the enabling period of the second control signal CTRL_R1, the scan result of the detecting unit 140a is corresponding to the high-voltage level of the electrode line 110a. Similarly, in the enabling periods of the second control signals CTRL_R2-CTRL-R5, the scan results of the detecting units 140b-140e are corresponding to the low-voltage levels of the electrode lines 110b-110e.

Therefore, in the time period t1, the voltage level of the scan signal SCAN_R1 outputted by the detecting unit 140a is high (the same as the voltage level of the electrode line 110a), and the voltage levels of the scan signals SCAN_R2-SCAN_R5 outputted by the detecting units 140b-140e are low (the same as the voltage levels of the electrode lines 110b-110e). Similarly, according to the scan results of the scan signals SCAN_R1-SCAN_R5 in the time period t1, the detecting signal SCAN_out outputted by the detecting circuit 120 in the time period t1 has an impulse corresponding to the scan signal SCAN_R1 (or corresponding to the enabling period of the second control signal CTRL_R1 of the detecting unit 140a).

At the end of the time period t1, the driving unit 130a outputs the shift signal SRL1 to the driving unit 130b, so as to initiate the driving unit 130b to output the driving signal SCAN_L2. In addition, since the detecting units 140a-140e have sequentially performed scanning in one cycle, the jig 102 outputs a second initiating signal STV_R to the detecting unit 140a again to start scanning the electrode lines 110a-110e by the detecting units 140a-140e.

Similarly, in the time period t2, the driving unit 130b outputs the driving signal SCAN_L2 to the electrode line 110b, such that the voltage level of the electrode line 110b is high and the voltage levels of the electrode line 110a and 110c-110e are low. Therefore, in the enabling period of the second control signal CTRL_R2, the scan result of the detecting unit 140b is corresponding to the high-voltage level of the electrode line 110b. Similarly, in the enabling periods of the second control signals CTRL_R1 and CTRL_R3-CTRL-R5, the scan results of the detecting units 140a and 140c-140e are corresponding to the low-voltage levels of the electrode lines 110a and 110c-110e.

Therefore, in the time period t2, the voltage level of the scan signal SCAN_R2 outputted by the detecting unit 140b is high (the same as the voltage level of the electrode line 110b), and the voltage levels of the scan signals SCAN_R1 and SCAN_R3-SCAN_R5 outputted by the detecting units 140a and 140c-140e are low (the same as the voltage levels of the electrode lines 110a and 110c-110e). Similarly, according to the scan results of the scan signals SCAN_R1-SCAN_R5 in the time period t2, the detecting signal SCAN_out outputted by the detecting circuit 120 in the time period t2 has an impulse corresponding to the scan signal SCAN_R2 (or corresponding to the enabling period of the second control signal CTRL_R2 of the detecting unit 140b).

After the time period t2, the detecting circuit 120 performs the detecting operations in time periods t3-t5 with the same step to complete the determination of the connecting status of each of the electrode lines 110a-110e. After the time period t5, a full scan of the touch panel 100 is completed. Under the situation that the connecting status of the each of the electrode lines 110a-110e is normal, the detecting signal SCAN_out has five impulses, and those five impulses are respectively corresponding to the enabling periods of the high-voltage levels of the electrode lines 110a-110e scanned by the detecting units 140a-140e.

In addition, the initiations of the detecting units 140a-140e are respectively performed by the jig 102 and the shift signals SRR1-SRR4. That is, the detecting unit 140a is initiated by the second initiating signal STV_R provided by the jig 102 at the beginning of each of the time periods t1-t5, and then the detecting units 140b-140e are sequentially initiated by the shift signals SRR1-SRR4 respectively. Then, the detecting units 140a-140e start sequentially detecting the electrode lines 110a-110e. In the present embodiment, since the detecting circuit 120 includes the five driving units 130a-130e, the detecting operation can be divided into the five time periods t1-t5. In other words, in the detecting operation, the number of times of receiving the second initiating signal STV_R by the detecting unit 140a of detecting units 140a-140e from the jig 102 is five.

In the detecting method of the present invention, as the number of the detecting units is different (different from five), the number of times of receiving the second initiating signal from the jig by the detecting unit may be correspondingly adjusted. In some embodiments, the detecting method further includes a step of outputting the initiating signal to a first detecting unit of the detecting units, in which the number of times of outputting the initiating signal to the first detecting unit and the number of the driving units are the same.

Moreover, after the jig 102 provides the driving unit 130a of the driving units 130a-130e with the first initiating signal STV_L, the driving units 130b-130e are sequentially initiated by the shift signals SRL1-SRL4. In the detecting operation, the number of times of providing the driving unit 130a (the first driving unit of the driving units 130a-130e) with the first initiating signal STV_L by the jig 102 is one. In the same detecting operation, the number of times of providing the detecting unit 140a (the first detecting unit of the detecting units 140a-140e) with the second initiating signal STV_R by the jig 102 is five. That is, a ratio of the number of the time of providing the first initiating signal STV_L to the driving unit 130a to the number of times of providing the second initiating signal STV_R to the detecting unit 140a by the jig 102 is from 1 to X, in which X is the number of the driving units 130a-130e.

Similarly, in the detecting method of the present invention, as the number of the driving units is different (different from five), the ratio of the number of times of receiving the first initiating signal by the first driving unit to the number of times of receiving the second initiating signal by the first detecting unit may be correspondingly adjusted. In some embodiments, the detecting method further includes a number of steps. The first initiating signal is outputted to the first driving unit of the driving units. The second initiating signal is outputted to the first detecting unit of the detecting units. A ratio of the number of times of outputting the first initiating signal to the number of times of outputting the second initiating signal is 1 to X, in which X is the number of the driving units.

Figure 6:
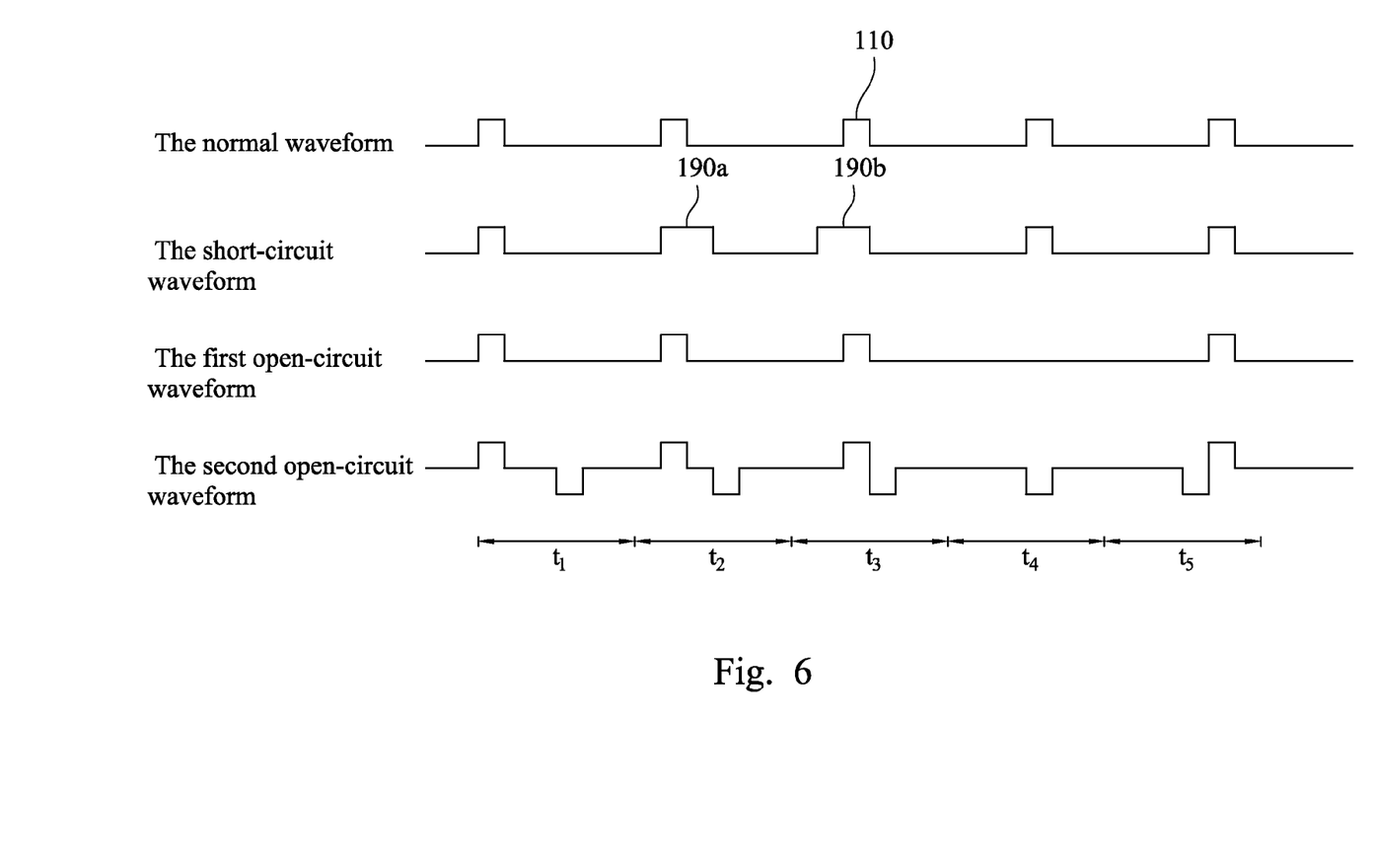
FIG. 6 is a timing diagram of signals with electrode lines of the touch panel in FIG. 4 under different connecting statuses.

FIG. 6 is a timing diagram of signals with electrode lines 110a-110e of the touch panel 100 in FIG. 4 under different connecting statuses. In the following embodiments, descriptions are provided with respect to the connecting statuses of the electrode lines 110a-110e, including the normal status, the short-circuit status, and the open-circuit status.

As previously described, under the condition that the connecting statuses of the electrode lines 110a-110e are normal (or the condition that the touch panel can operate normally), the waveform of the detecting signal SCAN_out outputted by the detecting circuit 120 is similar to a normal waveform illustrated in FIG. 6. In the normal waveform, the detecting signal SCAN_out has five impulses 190, in which there are the same time intervals between the adjacent impulses 190.

When the connecting status of each of the electrode lines 110a-110e is the short-circuit status, the detecting signal SCAN_out outputted by the detecting circuit 120 may have continuous impulses. Then, according to the continuous impulses of the detecting signal SCAN_out, the position of the electrode lines 110a-110e with the short-circuit status can be determined and found.

For example, when the short-circuit status occurs between the electrode lines 110b and 110c of the touch panel 100 illustrated in FIG. 4, the waveform of the detecting signal SCAN_out outputted by the detecting circuit 120 is similar to a short-circuit waveform illustrated in FIG. 6. In the short-circuit waveform, the detecting signal SCAN_out has three impulses 190 which are similar to the impulses of the normal waveform and two impulses 190a and 190b which have longer duration time. The impulses 190a and 190b are respectively belong to time periods t2 and t3, and are corresponding to the scan results of the electrode lines 110b and 110c.

According to the short-circuit waveform, since the short-circuit status occurs between the electrode lines 110b and 110c, the voltage levels of the electrode lines 110b and 110c are high when the driving unit 130b outputs the driving signal SCAN_L2. Similarly, the voltage levels of the electrode lines 110b and 110c are high when the driving unit 130c outputs the driving signal SCAN_L3.

In the time period t2, since the voltage levels of the electrode lines 110b and 110c are high, the scan results of the detecting units 140b and 140c are corresponding to the high-voltage levels of the electrode lines 110b and 110c. Then, the detecting units 140b and 140c respectively output the scan signals SCAN_R2-SCAN_R3 corresponding to the high-voltage levels of the electrode lines 110b and 110c.

Similarly, in the time period t3, since the voltage levels of the electrode lines 110b and 110c are high, the scan results of the detecting units 140b and 140c are corresponding to the high-voltage levels of the electrode lines 110b and 110c. Then, the detecting units 140b and 140c respectively output the scan signals SCAN_R2-SCAN_R3 corresponding to the high-voltage levels of the electrode lines 110b and 110c.

In addition, the two impulses 190a and 190b with the longer duration time respectively belong to time periods t2 and t3, and these two impulses 190a and 190b are corresponding to the scan results of the electrode lines 110b and 110c. Therefore, according to the short-circuit waveform, the detecting method of the present invention can determine that the short-circuit status in the touch panel 100 occurs between the electrode lines 110b and 110c.

However, the aforementioned short-circuit waveform is exemplary. The short-circuit waveform in practice may be slightly different from the short-circuit waveform illustrated in FIG. 6 due the difference of the resistance or the difference of the position where the short-circuit status occurs.

On the other hand, when the connecting status of one of the electrode lines 110a-110e of the touch pane 100 is the open-circuit status, the detecting signal SCAN_out outputted by the detecting circuit 120 is different from the normal waveform and the short-circuit waveform. In addition, when the detecting signal SCAN_out is different from the normal waveform and the short-circuit waveform, in order to detect whether the connecting status of one of the electrode lines 110a-110e is the open-circuit status, a resistor circuit (not illustrated) may be disposed in the jig 102. The resistor circuit is configured to provide the electrode lines 110a-110e with a power supply, such that the electrical potential of the electrode lines 110a-110e with the open-circuit status can be provided by the power supply of the resistor circuit.

For example, when the electrical potential provided by the resistor circuit is the same as the electrical potential V2 (see FIG. 2) of the driving units 130a-130e and the open-circuit status occurs at the electrode line 110d of the touch panel 100, the detecting signal SCAN_out outputted by the detecting circuit 120 is similar to a first open-circuit waveform illustrated in FIG. 6. Comparing to the normal waveform, the detecting signal SCAN_out in the first open-circuit waveform does not have the impulse 190 in the time period t4.

Under the condition that the open-circuit status occurs at the electrode line 110d, since the electrode line 110d connected to the detecting unit 140d cannot receive the driving signal SCAN_L4 outputted by the driving unit 130d, the electrical potential of the scan signal SCAN_R4 outputted by the detecting unit 140d is provided by the power supply of the resistor circuit. Moreover, since the electrical potential provided by the power supply of the resistor circuit and the second electrical potential V2 of the driving units 130a-130e are the same, the electrical potential of the detecting signal SCAN_out corresponding to the scan signal SCAN_R4 is low.

Furthermore, in some embodiments, the electrical potential provided by the power supply of the resistor circuit is smaller than the second electrical potential V2 of the driving units 130a-130e. In this configuration, when the open-circuit status occurs at the electrode line 110d, the electrical potential of the detecting signal SCAN_out corresponding to the scan signal SCAN_R4 is smaller than the low-voltage level of the normal waveform, as shown in a second open-circuit waveform illustrated in FIG. 6.

When the open-circuit status occurs at the electrode lines 110a-110e, the corresponding detecting units 140a-140d cannot receive the driving signals SCAN_L1-SCAN_L5 outputted by the driving units 130a-130e. Therefore, the electrical potentials of the scan signals SCAN_R1-SCAN_R5 outputted by the detecting units 140a-140d corresponding to the open-circuit status are defined by the power supply of the resistor circuit. However, a person having ordinary skill in the art may choose a proper electrical potential provided by the power supply of the resistor circuit, so as to distinguish between the normal waveform and the open circuit waveform.

However, the aforementioned open-circuit waveforms are exemplary waveforms. The open-circuit waveform in practice may be different from the first open-circuit waveform and the second open-circuit waveform illustrated in FIG. 6 due the difference of the resistance or the difference of the position where the open-circuit status occurs.

In addition, as previously described, the driving signals SCAN_L1-SCAN_L5 in the detecting circuit 120 can be transmitted from the left side to the right side or from the right side to the left side. When the short-circuit status or the open-circuit status occurs at one or more of the electrode lines 110a-110e, by performing the detecting method with these two transmitting directions respectively (from the left side to the right side and from the right side to the left side), two detecting signals SCAN_out respectively outputted by the detecting circuit 120 are obtained, and the position at which the short-circuit status or the open-circuit status occurs can be found by comparing these two detecting signals SCAN_out.

As a result, the touch panel of the present invention can be connected to the jig after the transmitter electrodes (Tx) are formed, so as to start the detecting operation. Since the method for detecting the touch panel is performed though the detecting circuit and the electrode lines, the detecting method can be performed in every stage before forming the receiver electrodes (Rx) of the touch panel. In the following embodiments, descriptions are provided with respect to different stages of the touch panel in a manufacturing process.

Figure 7:
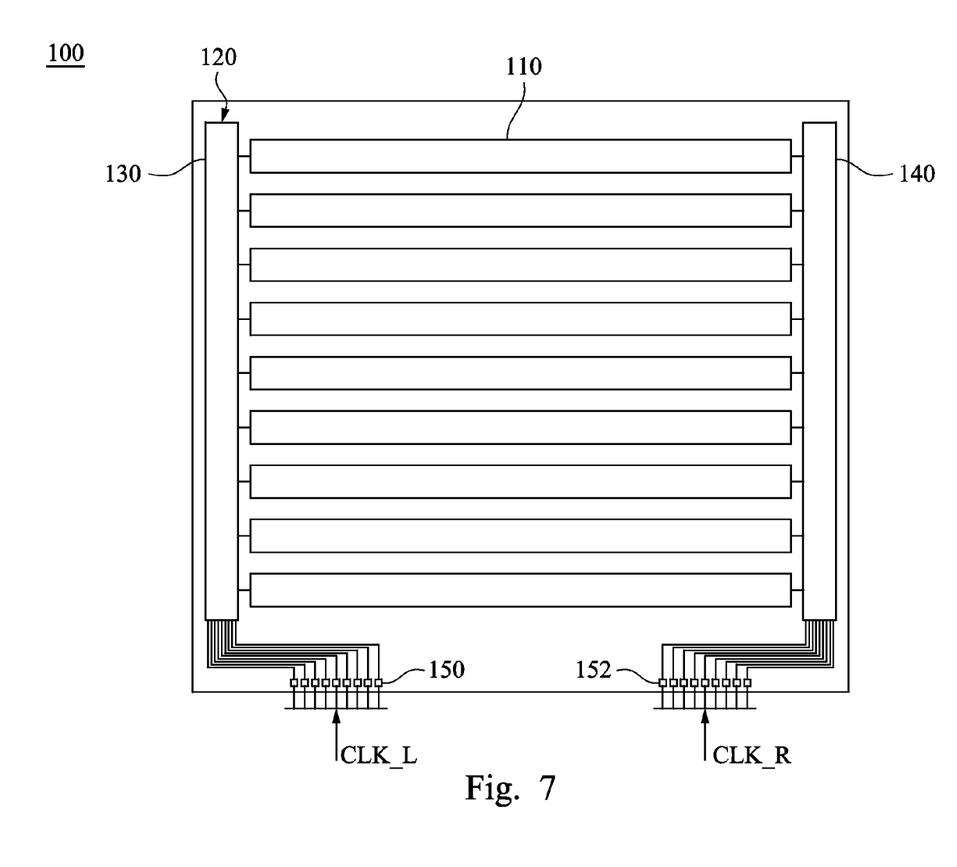
FIG. 7 is a schematic top view of a touch panel according to a third embodiment of this invention.

FIG. 7 is a schematic top view of a touch panel 100 according to a third embodiment of this invention. A touch panel 100 includes electrode lines 110, a detecting circuit 120, first terminals 150 and second terminals 152, in which the detecting circuit 120 include driving units 130 and detecting units 140. The first terminals 150 are respectively electrically connected to the driving units 130 of the detecting circuit 120 and a jig (not illustrated). The second terminals 152 are respectively electrically connected to the detecting units 140 of the detecting circuit 120 and the jig. The first clock signal CLK_L is transmitted from the jig to the driving units 130 via the first terminals 150, and the second clock signal CLK_R is transmitted from the jig to the detecting units 140 via the second terminals 152.

In the present embodiment, the jig outputs the first clock signal CLK_L and the second clock signal CLK_R to the electrode lines 110 and the detecting circuit 120, and is used as a power supply of the touch panel. In this stage, by the detecting method, when the touch panel 100 is found that the unexpected connecting status occurs, the touch panel 100 with the unexpected connecting status can be removed from the production line. In other words, with the detecting operation in this stage, it can be ensured that the touch panel 100 entering a next stage of the manufacturing process has a normal connecting status. In addition, in this stage, other elements have not been installed on the touch panel 100 yet, such as a chip or a flexible circuit board. Therefore, if it is found that the touch panel 100 has the unexpected connecting status, the waste will be prevented since the other elements have not been assembled on the touch panel 100 yet.

Figure 8:
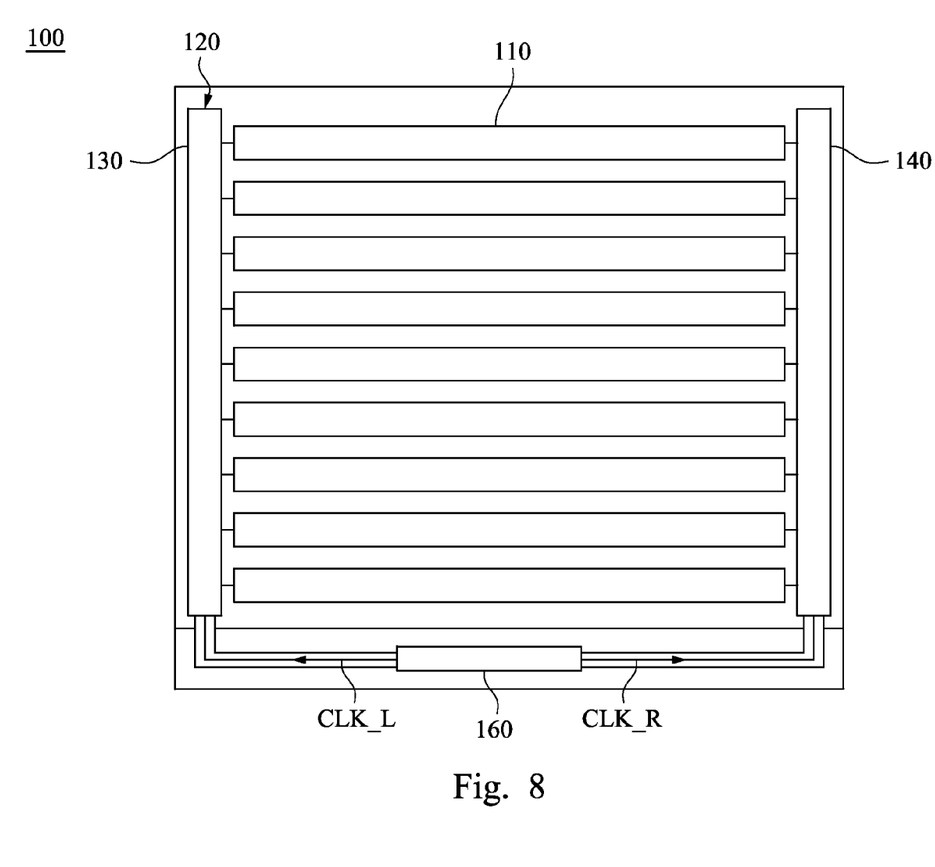
FIG. 8 is a schematic top view of a touch panel according to a fourth embodiment of this invention.

FIG. 8 is a schematic top view of a touch panel 100 according to a fourth embodiment of this invention. The difference between the present embodiment and the third embodiment is that the touch panel 100 further includes a driving chip 160. The driving chip 160 is electrically connected to the driving units 130, the detecting units 140, and the jig (not illustrated). The driving chip 160 is configured to respectively transmit the first clock signal CLK_L and the second clock signal CLK_R provided by the jig to the driving units 130 and the detecting units 140.

In this stage, when the driving chip 160 is installed on the touch panel 100, by the detecting method, the connecting status of each of the electrode lines can be detected by the jig. After the detecting operation, the touch panel 100 with the normal connecting status can enter a next stage of the manufacturing process.

Figure 9:
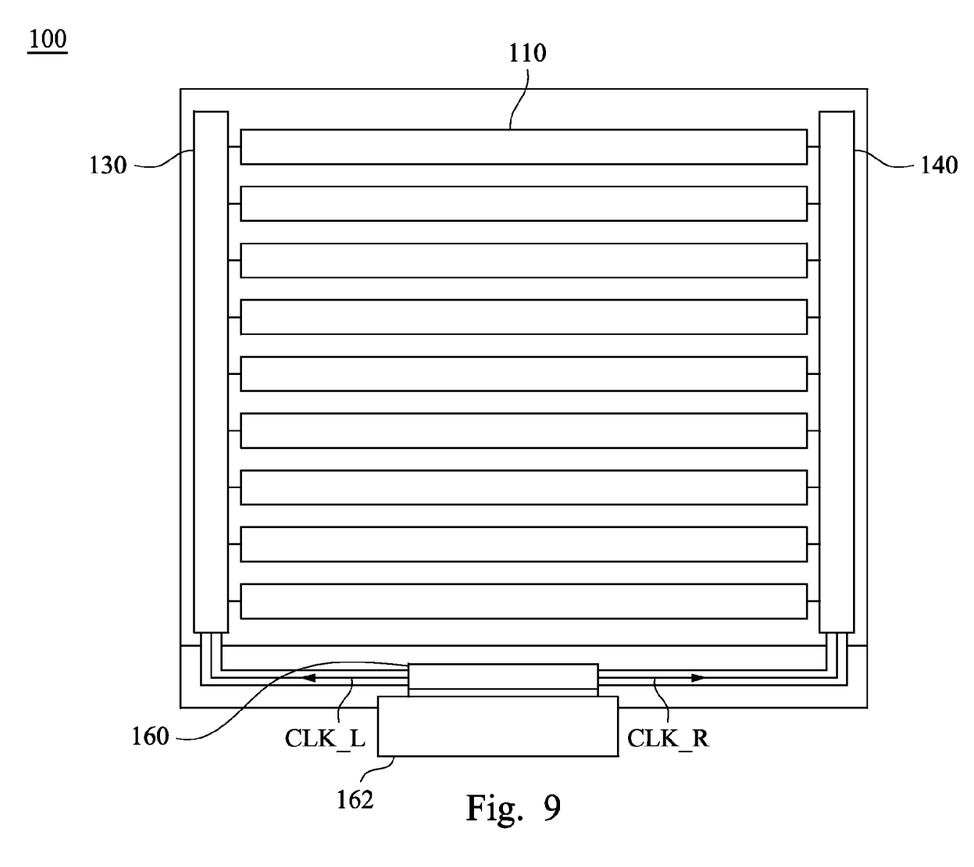
FIG. 9 is a schematic top view of a touch panel according to a fifth embodiment of this invention.

FIG. 9 is a schematic top view of a touch panel 100 according to a fifth embodiment of this invention. The difference between the present embodiment and the third embodiment is that the touch panel 100 further includes a driving chip 160 and a flexible circuit board 162. The driving chip 160 is electrically connected to the driving units 130 and the detecting units 140. The driving chip 160 is configured to output the first clock signal CLK_L to the driving units 130 and to output the second clock signal CLK_R to the detecting units 140. The flexible circuit board 162 is electrically connected to the driving chip 160 and the jig (not illustrated). The flexible circuit board 162 is configured to transmit the first clock signal CLK_L and the second clock signal CLK_R to the driving chip 160.

In this stage, when the driving chip 160 and the flexible circuit board 162 are installed on the touch panel 100, by the detecting method, the connecting status of each of the electrode lines can be detected through the jig. Similarly, after the detecting operation, the touch panel 100 with the normal connecting status can enter a next stage of the manufacturing process.

Figure 10:
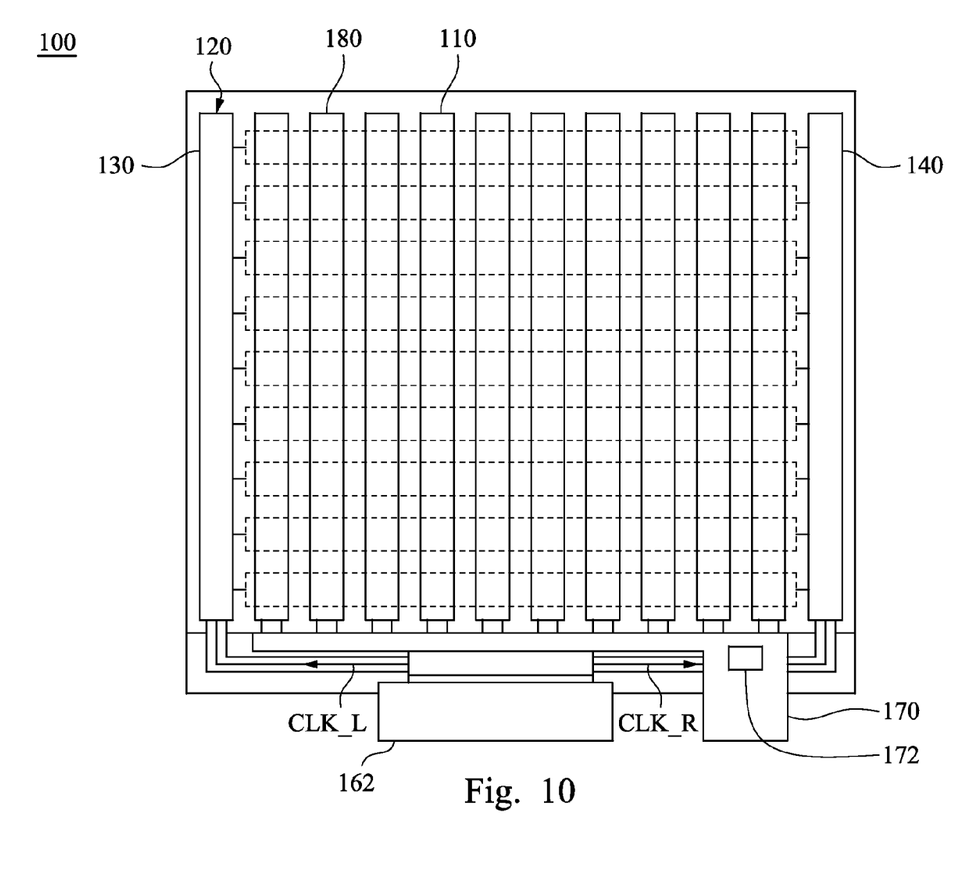
FIG. 10 is a schematic top view of a touch panel according to a sixth embodiment of this invention.

FIG. 10 is a schematic top view of a touch panel 100 according to a sixth embodiment of this invention. The difference between the present embodiment and the third embodiment is that the touch panel 100 further includes a driving chip 160, a flexible circuit board 162, receiver electrode lines (Rx) 180, a touch circuit board 170, and a touch chip 172.

The driving chip 172 is electrically connected to the driving units 130 and the detecting units 140. The driving chip 172 is configured to output the first clock signal CLK_L to the driving units 130 and to output the second clock signal CLK_R to the detecting units 140. The flexible circuit board 162 is electrically connected to the driving chip 160 and the jig (not illustrated). The flexible circuit board 162 is configured to transmit the first clock signal CLK_L and the second clock signal CLK_R provided by the jig to the driving chip 160. The receiver electrode lines 180 are disposed on the electrode lines 110, in which the receiver electrode lines 180 and the electrode lines 110 are grid-shaped. The touch circuit board 170 is electrically connected to the driving chip 160 and the receiver electrode lines 180. The touch chip 172 is electrically connected to the touch circuit board 170 and configured to scan the level voltages of the receiver electrode lines 180.

In this stage, when the driving chip 160, the flexible circuit board 162, the receiver electrode lines 180, the touch circuit board 170, and the touch chip 172 are assembled on the touch panel 100, by the detecting method, the connecting status of each of the electrode lines can be detected through the jig. The connecting status includes the connecting statuses of the electrode lines 110 and the receiver electrode lines 180.

In the previously stage of the manufacturing process (the touch panel 100 in FIG. 9), the detecting method may first determine the connecting status of the electrode lines 110 of the touch panel 100. Under the condition that the connecting status of the touch panel 100 in the previously stage of the manufacturing process is normal, if it is detected that the touch panel 100 in the present stage has the unexpected connecting status, this unexpected connecting status may occur at the receiver electrode lines 180.

As a result, the touch panel of the present invention includes the electrode lines and the detecting circuit, in which the detecting circuit includes the driving units and the detecting units. The detecting circuit is configured to detect the connecting status of the electrode lines through the driving units and the detecting units, in which the connecting status includes, for example, the normal status, the short-circuit status, and the open-circuit status. Since the touch panel performs the detecting operation without the receiver electrode (Rx) but with the detecting circuit and, the touch electrode (or transmitter electrode, Tx) can be detected first. After the receiver electrodes are installed on the touch panel, the receiver electrodes can be detected again to determine whether the connecting status of the receiver electrodes is normal.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch panel, comprising: a plurality of electrode lines; and a detecting circuit, comprising: a plurality of driving units configured to sequentially output a plurality of driving signals to the electrodes lines according to a first clock signal, so as to change voltage levels of the electrode lines; and a plurality of detecting units, wherein two ends of each of the electrode lines are respectively coupled to one of the driving units and a corresponding one of the detecting units, and the detecting units are configured to sequentially scan the voltage levels of the electrode lines according to a second clock signal and to output a plurality of scan signals, wherein the first clock signal and the second clock signal have different frequencies, and the detecting circuit generates a detecting signal according to the scan signals.

2. The touch panel of claim 1, wherein an N-th driving unit of the driving units is configured to output a shift signal to an (N+1)-th driving unit of the driving units, wherein N is a positive integer, and the N-th driving unit comprises:
   a first shift-register circuit configured to receive the first clock signal and the shift signal outputted by an (N−1)-th driving unit and to generate a first control signal after receiving the shift signal; and
   a first level converting unit configured to output the driving unit according to the first control signal.

3. The touch panel of claim 1, wherein an N-th detecting unit of the detecting units is configured to output a shift signal to an (N+1)-th detecting unit of the detecting units, wherein N is a positive integer, and the N-th detecting unit comprises: a shift-register circuit configured to receive the second clock signal and the shift signal outputted by an (N−1)-th detecting unit and to generate a control signal after receiving the shift signal; and a level converting unit configured to scan the voltage level of one of the corresponding electrode lines according to the control signal, so as to output the scan signal.

4. The touch panel of claim 1, further comprising:
   a plurality of first terminals respectively electrically connected to the driving units and a jig; and
   a plurality of second terminals respectively electrically connected to the detecting units and the jig, wherein the first clock signal is transmitted from the jig to the driving units via the first terminals, and the second clock signal is transmitted from the jig to the detecting units via the second terminals.

5. The touch panel of claim 1, further comprising:
   a driving chip which is electrically connected to the driving units, the detecting units and a jig, and is configured to transmit the first clock signal and the second clock signal provided by the jig respectively to the driving units and the detecting units.

6. The touch panel of claim 1, further comprising:
   a driving chip electrically which is connected to the driving units and the detecting units and is configured to output the first clock signal to the driving units and output the second clock signal to the detecting units; and
   a flexible circuit board which is electrically connected to the driving chip and a jig and is configured to transmit the first clock signal and the second clock signal to the driving chip.

7. The touch panel of claim 1, further comprising:
   a driving chip which is electrically connected to the driving units and the detecting units and is configured to output the first clock signal to the driving units and to output the second clock signal to the detecting units;
   a flexible circuit board which is electrically connected to the driving chip and a jig and is configured to transmit the first clock signal and the second clock signal provided by the jig to the driving chip;
   a plurality of receiver electrode lines disposed on the electrode lines, wherein the receiver electrode lines and the electrode lines form a grid shape;
   a touch circuit board electrically connected to the driving chip and the receiver electrode lines; and
   a touch chip electrically which is connected to the touch circuit board and is configured to scan the level voltages of the receiver electrode lines.

8. A method for detecting a touch panel, the method comprising: outputting a plurality of driving signals to a plurality of electrode lines by a plurality of driving units according to a first clock signal, so as to change voltage levels of the electrode lines; scanning the voltage levels of the electrode lines by a plurality of detecting units according to a second clock signal so as to output a plurality of scan signals, wherein the first clock signal and the second clock signal have different frequencies; and generating a detecting signal according to the scan signals, so as to determine a connecting status of each of the electrode lines.

9. The method of claim 8, wherein a frequency of the first clock signal is smaller than a frequency of the second clock signal, and a frequency of the second clock signal is in a range from A times the frequency of the first clock signal to 2A times the frequency of the first clock signal, wherein A is the number of the driving units.

10. The method of claim 8, further comprising:
outputting an initiating signal to a first detecting unit of the detecting units, wherein the number of times of outputting the initiating signal to the first detecting unit and the number of the driving units are the same.

11. The method of claim 8, further comprising:
outputting a first initiating signal to a first driving unit of the driving units; and
outputting a second initiating signal to a first detecting unit of the detecting units, and a ratio of the number of times of outputting the first initiating signal to the number of times of outputting the second initiating signal is from 1 to X, wherein X is the number of the driving units.

* * * * *